United States Patent
Apvrille

(10) Patent No.: US 11,023,575 B2
(45) Date of Patent: Jun. 1, 2021

(54) SECURITY SANITIZATION OF USB DEVICES

(71) Applicant: Fortinet, Inc., Sunnyvale, CA (US)

(72) Inventor: Axelle Apvrille, Biot (FR)

(73) Assignee: Fortinet, Inc., Sunnyvale, CA (US)

( * ) Notice: Subject to any disclaimer, the term of this patent is extended or adjusted under 35 U.S.C. 154(b) by 301 days.

(21) Appl. No.: 15/632,627

(22) Filed: Jun. 26, 2017

(65) Prior Publication Data

US 2018/0373864 A1    Dec. 27, 2018

(51) Int. Cl.
| | |
|---|---|
| *G06F 21/56* | (2013.01) |
| *G06F 21/55* | (2013.01) |
| *G06F 21/60* | (2013.01) |
| *G06F 21/62* | (2013.01) |
| *G06F 21/57* | (2013.01) |

(52) U.S. Cl.
CPC ......... *G06F 21/552* (2013.01); *G06F 21/57* (2013.01); *G06F 21/604* (2013.01); *G06F 21/6209* (2013.01); *G06F 21/56* (2013.01); *G06F 21/564* (2013.01); *G06F 21/577* (2013.01); *G06F 2221/2143* (2013.01)

(58) Field of Classification Search
CPC .......... G06F 21/50; G06F 21/51; G06F 21/55; G06F 21/552; G06F 21/56; G06F 21/561; G06F 21/562; G06F 21/563; G06F 21/564; G06F 21/567; G06F 21/568; G06F 21/57; G06F 21/577; G06F 21/604; G06F 21/6209; G06F 2221/2143; H04L 63/14; H04L 63/1408; H04L 63/1416; H04L 63/1425; H04L 63/1433

See application file for complete search history.

(56) References Cited

U.S. PATENT DOCUMENTS

| | | | |
|---|---|---|---|
| 8,826,435 B1 * | 9/2014 | Chiang | G06F 21/567 713/193 |
| 8,910,288 B2 * | 12/2014 | Young | G06F 21/552 726/24 |
| 9,117,075 B1 * | 8/2015 | Yeh | G06F 21/56 |
| 9,756,070 B1 * | 9/2017 | Crowell | G06F 9/45533 |

(Continued)

OTHER PUBLICATIONS

CIRCLean—USB key sanitizer. https://www.circl.lu/projects/CIRCLean/. pp. 11.

(Continued)

*Primary Examiner* — Malcolm Cribbs

(57) ABSTRACT

Methods and systems for performing security sanitization of Universal Serial Bus (USB) devices are provided. According to one embodiment, existence of a Universal Serial Bus (USB) device connected to a USB port of a network security device is detected by the network security device. Responsive thereto, read and write access to a memory of the USB device is facilitated, by mounting, by the network security device, the USB device within a file system of the network security device. Multiple security scans are caused to be performed by the network security device on the USB device, including: (i) an antivirus (AV) scan to identify existence of one or more known viruses using an AV engine of the network security device and (ii) a vulnerability scan for one or more known vulnerabilities or exploits using a detection engine of the network security device.

19 Claims, 6 Drawing Sheets

(56) References Cited

U.S. PATENT DOCUMENTS

| | | | | |
|---|---|---|---|---|
| 2007/0261118 | A1* | 11/2007 | Lu | G06F 21/562 726/24 |
| 2009/0113128 | A1* | 4/2009 | Zhao | G06F 21/56 711/115 |
| 2010/0017546 | A1* | 1/2010 | Poo | G06F 21/31 710/32 |
| 2011/0107425 | A1* | 5/2011 | Lee | G06F 21/566 726/24 |
| 2011/0197280 | A1* | 8/2011 | Young | G06F 21/552 726/24 |
| 2012/0079599 | A1* | 3/2012 | Matsune | G06F 21/51 726/26 |
| 2013/0074178 | A1* | 3/2013 | Sobol | G06F 21/78 726/17 |
| 2013/0091575 | A1* | 4/2013 | Duncan | G06F 21/56 726/24 |
| 2013/0227636 | A1* | 8/2013 | Bettini | H04W 12/12 726/1 |
| 2013/0318610 | A1* | 11/2013 | Zaitsev | G06F 21/56 726/24 |
| 2014/0337558 | A1* | 11/2014 | Powers | G06F 13/4072 710/313 |
| 2016/0328579 | A1* | 11/2016 | Jois | G06F 21/56 |
| 2017/0039146 | A1* | 2/2017 | Lanigan | G06F 21/554 |
| 2017/0068810 | A1* | 3/2017 | Yao | G06F 21/57 |
| 2018/0048702 | A1* | 2/2018 | Patil | H04L 63/1408 |
| 2018/0225230 | A1* | 8/2018 | Litichever | G06F 21/56 |
| 2018/0268144 | A1* | 9/2018 | Warpinski | G06F 21/6236 |
| 2018/0270194 | A1* | 9/2018 | Beitler | G06F 13/4282 |
| 2018/0324179 | A1* | 11/2018 | Hou | H04L 63/0876 |

OTHER PUBLICATIONS

"The Qualys Cloud Platform—the industry's most advanced, scalable & extensible Cloud platform." Qualys Vulnerability Management (VM) Features | Qualys, Inc. https://www.qualys.com/suite/vulnerability-management/features/. pp. 8.

"The Market Leader in Vulnerability Management—Automation & Global Scalability in the Cloud." Qualys Vulnerability Management | Qualys, Inc. https://www.qualys.com/suite/vulnerability-management/ pp. 4.

"Offline Scanner Appliance—User Guide." Qualys. Aug. 12, 2016. 24 pgs.

"Scanner Appliance Quick Start Guide." Qualys. 2 pgs.

"Scanner Appliance—User Guide." Qualys. Mar. 10, 2017. 72 pgs.

* cited by examiner

SECURITY SANITIZATION OF USB DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to network security. In particular, embodiments of the present invention relate to systems and methods for performing security sanitization of Universal Serial Bus (USB) devices.

Description of the Related Art

Universal Serial Bus (USB) is an industry standard that defines cables, connectors and communications protocols for connection, communication, and power supply between computers and devices. The USB standard defines an interconnect format for computing devices in which data is transmitted over a serial connection between a host and a device, and where each device is assigned an address, allowing multiple devices to communicate with the same host using the same wires. The USB specification is compatible with multiple device classes, including but not limited to keyboards, mice, printers, mass storage devices, video playback devices, Internet of Things (IoT) devices, mobile phones, and vendor specific items. Some physical devices appear as two or more logical USB devices, such as a webcam that has an audio and a video USB connection. USB data is typically sent in packets, some of which are indicative of devices being added or removed. Other packet types are data, which are indicative of, for instance, acknowledgement of data received or read, and other types.

With increasing use of USB devices, the prevalence of USB devices that are infected with malware, virus, among other network security threats is also growing. Such infected USB devices utilize weaknesses in the USB security infrastructure to attack unprotected hosts and devices, making them prone to data theft or loss (e.g., undesired encryption of sensitive files), among other like security risks.

Existing solutions purporting to address USB device-based security issues are limited to performing a content scan of files stored on USB flash drives that are recognized by the Windows operating system, but fail to consider other files or additional parameters/attributes, including, but not limited to, the firmware version of the USB device at issue, the availability of updates, multiple partitions, and exposure of the USB device at issue to security vulnerabilities. As such, existing solutions offer limited protections by failing to address other USB-based devices, such as smartphones, tablet computers, MP3 players, smart watches, fitness trackers, still and video cameras and the like, and by ignoring potential security vulnerabilities as well as content associated with Linux, Android and other operating systems.

There is therefore need for systems and methods that enable thorough and comprehensive security sanitization, content scanning, and vulnerability assessment of a broad range of USB devices.

SUMMARY

Methods and systems are described for performing security sanitization of Universal Serial Bus (USB) devices. According to one embodiment, existence of a Universal Serial Bus (USB) device connected to a USB port of a network security device is detected by the network security device. Responsive thereto, read and write access to a memory of the USB device is facilitated, by mounting, by the network security device, the USB device within a file system of the network security device. Multiple security scans are caused to be performed by the network security device on the USB device, including: (i) an antivirus (AV) scan to identify existence of one or more known viruses using an AV engine of the network security device and (ii) a vulnerability scan for one or more known vulnerabilities or exploits using a detection engine of the network security device.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
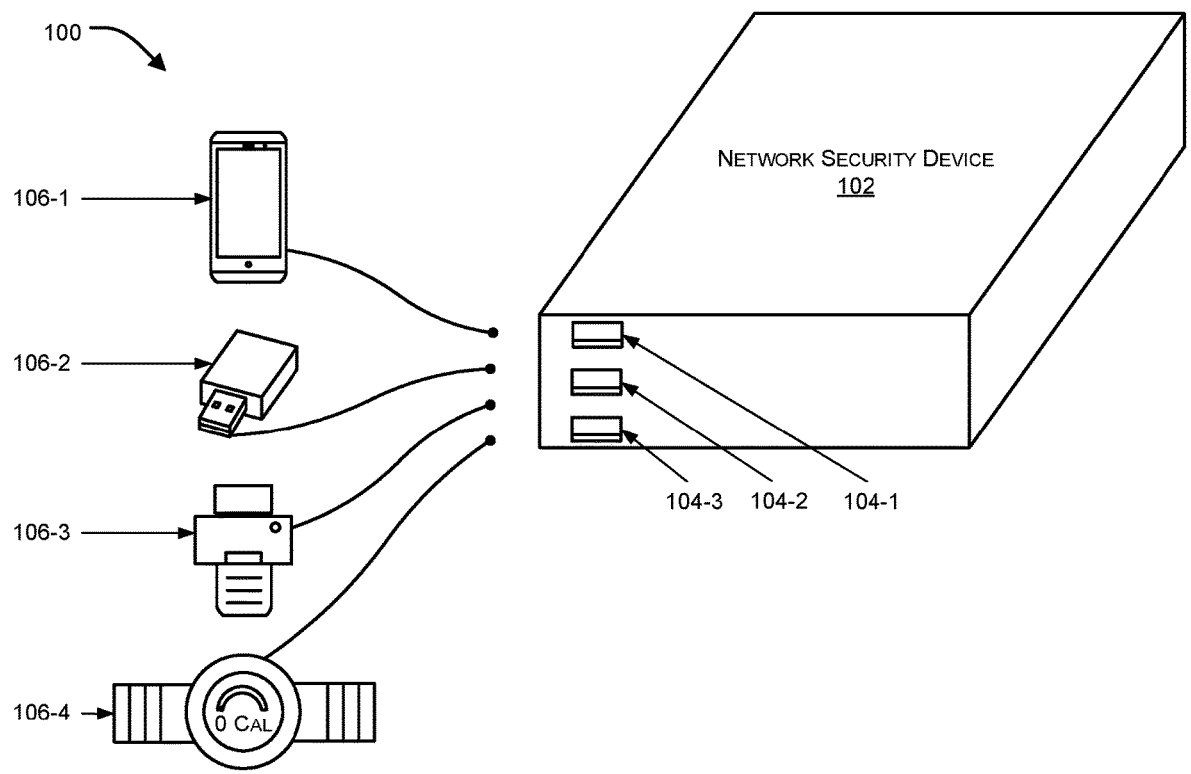
FIGS. 1A and 1B illustrate exemplary network implementation architectures in which or with which embodiments of the present invention can be implemented.

Systems and methods are described for performing thorough security scanning of USB devices. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process.

The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Embodiments of the present disclosure generally relate to network security. In particular, embodiments of the present invention relate to systems and methods for performing security scans of Universal Serial Bus (USB) devices, including those without an Internet Protocol (IP) address.

In an aspect, the present disclosure relates to a network security device (which may be referred to by the acronym NSD hereinafter) that can detect existence of one or more Universal Serial Bus (USB) devices connected to one or more of its USB ports, and can perform security scans on the connected USB devices including: (i) an antivirus (AV) scan to identify existence of one or more known viruses using an AV engine of the NSD, and (ii) a vulnerability scan for one or more known vulnerabilities and/or exploits using a detection engine (such as, for instance, an Intrusion Detection System (IDS) engine) of the NSD.

In an aspect, the NSD can further incorporate virus signatures and attack signatures for performing the security scans. The NSD may be further configured to evaluate whether the connected USB devices are up to date by comparing their firmware, operating systems, and application(s) with corresponding most recent versions available and when one or more of the USB devices are not up to date, the proposed NSD can download/install the most recent versions of any or a combination of firmware, operating system, and applications as may be applicable on the one or more USB devices.

In an aspect, the present disclosure relates to a method comprising the steps of detecting, by a network security device (NSD), existence of a Universal Serial Bus (USB) device connected to a USB port of the NSD; responsive to said detecting, facilitating read and write access to a memory of the USB device, by mounting, by the NSD, the USB device within a file system of the NSD; and causing, by the NSD, a plurality of security scans to be performed on the USB device, including: (i) an antivirus (AV) scan to identify existence of one or more known viruses using an AV engine of the NSD and (ii) a vulnerability scan for one or more known vulnerabilities or exploits using an Intrusion Detection System (IDS) engine of the NSD. In one embodiment, the AV scan and/or the vulnerability scan can be performed online (i.e., while a connection to the Internet is available to the NSD) or offline (i.e., while a connection to the Internet is not available to the NSD).

In another aspect, the method can further include the step of evaluating, by the NSD, whether the USB device is up to date, wherein the step of evaluating can include comparing a version of firmware installed on the USB device with a most recent firmware version available for the USB device such that when the result of such an evaluation is negative, the method can include: downloading, by the NSD, the most recent firmware version; and causing, by the NSD, the most recent firmware version to be installed on the USB device.

In another aspect, the step of evaluating can include comparing a version of an operating system installed on the USB device with a most recent operating system version available for the USB device such that when the result of said evaluating is negative, the method can include: downloading, by the NSD, the most recent operating system version; and causing, by the NSD, the most recent operating system version to be installed on the USB device.

In yet another aspect, the step of evaluating can include comparing a version of an application installed on the USB device with a most recent application version available for the USB device such that when the result of said evaluating is negative, the method can include: downloading, by the NSD, the most recent application version; and causing, by the NSD, the most recent application version to be installed on the USB device.

In yet another aspect of the method, when the existence of the one or more known viruses is identified or the existence of the one or more known vulnerabilities or exploits is identified, then an administrator of the network security device can be alerted. In another exemplary aspect, the USB device can be quarantined responsive to detection of a vulnerability/virus/malware/exploit.

In an aspect of the method, the NSD can include any or a combination of a gateway device, a firewall device, an intrusion prevention system (IPS), an intrusion detection system (IDS), a hybrid IDS (HIDS), a network IDS (NIDS), and a Unified Threat Management (UTM) device.

In another aspect, the USB device can include a data storage device, a fitness tracker, a smartphone, a tablet computer, a smart watch, a smart glass or an Internet of Things (IoT) device.

In an aspect, the security scans are performed on the USB device by a daemon running on the NSD.

In an aspect, the present disclosure further relates to a non-transitory computer-readable storage medium embodying a set of instructions, which when executed by one or more processors of a NSD, can cause the one or more processors to perform a method comprising: detecting existence of a Universal Serial Bus (USB) device connected to a USB port of the NSD; responsive to said detecting, facilitating read and write access to a memory of the USB device, by mounting the USB device within a file system of the NSD; and causing a plurality of security scans to be performed on the USB device, including: (i) an antivirus (AV) scan to identify existence of one or more known viruses using an AV engine of the NSD and (ii) a vulnerability scan for one or more known vulnerabilities or exploits using an Intrusion Detection System (IDS) engine of the NSD.

Figure 1B:
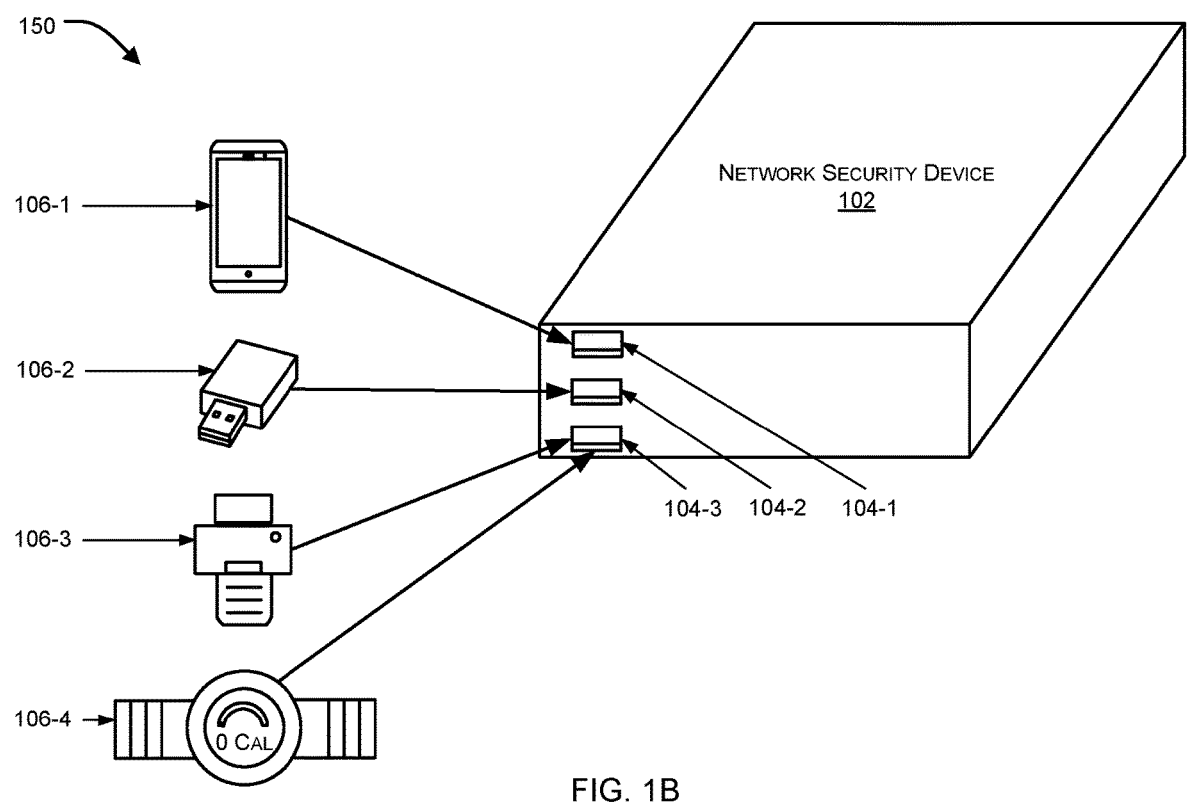

FIGS. 1A and 1B illustrate exemplary network implementation architectures 101 and 150 in which or with which embodiments of the present invention can be implemented.

In an aspect, the present disclosure can include a network security device (NSD) 102 that can have one or more USB ports 104-1, 104-2 and 104-3 (which may be collectively referred to as USB ports or USB slots, or simply as ports/slots 104 hereinafter) that are configured to interface (directly or indirectly via a USB cable) with USB devices, such as a mobile phone 106-1, a flash drive 106-2, a printer 106-3, and a fitness tracker 106-4 (which may be collectively referred to as USB device(s) 106) for charging, data transfer, or any other intended functional purpose. Some of these ports 104 can be configured to receive two or more USB devices 106 or receive a USB device 106 that has one to many USB ports, and therefore the present disclosure encompasses all such USB devices 106 that are directly or indirectly coupled with NSD 102. Such USB devices 106 may be storage devices such as pen drives/hard disks, or can be other computing devices such as mobile phones, smart watches, fitness trackers, tablet PCs, among other like devices. In an exemplary embodiment, port 104-3 can be configured to connect two USB devices, wherein such USB ports 104 can be in form of slots that can take the corresponding connectors of USB devices 106. In another aspect, any USB device 106 can be connected to any of the USB ports 104 of the NSD 102.

In an aspect, any or a combination of these devices can be connected to USB ports 104 provided in the NSD 102. As illustrated in FIG. 1B, mobile device 106-1 can be connected to USB port 104-1 of NSD 102, and in a similar manner, USB storage device (e.g., a USB flash drive, also variously referred to as a USB drive, a USB stick, a thumb drive, a pen drive, a jump drive, a disk on key, a flash-drive or a USB memory, in the form of a data storage device that includes flash memory with an integrated USB interface) 106-2 can be connected to USB port 104-2. Likewise, USB port 104-3 can accommodate two USB devices as shown—USB printer 106-3 and smart watch 106-4 by means of a one-to-two converter, for instance. It can be appreciated that such a representation is purely exemplary in nature, and any more than one or all USB ports of the NSD 102 can be connected to devices having USB connectors (not shown).

In an aspect, NSD 102 of the present disclosure can be any or a combination of a firewall, an intrusion detection system (IDS), an intrusion prevention system (IPS), a gateway device, a UTM appliance or any other security device having capabilities mentioned herein.

In an exemplary implementation of the present disclosure, when a USB device 106 is connected to a USB port 104 of NSD 102 that has been powered on, USB device 106 will commence charging (if it has an internal batter and is configured to do so) by drawing power via USB port 104. In addition, responsive to detecting the presence of USB device 106, NSD 102 can run one or more security scans on the connected USB device 106, wherein such scans can include, but are not limited to, an antivirus (AV) scan that can help identify existence of one or more known viruses, or a vulnerability scan for one or more known vulnerabilities or exploits.

In an aspect, antivirus scan can use an AV engine of the NSD 102, wherein the AV engine can be continuously updated with latest virus signatures so as to provide maximum virus protection to the connected USB device 106. In another aspect, vulnerability scan can use a detection engine (such as an Intrusion Detection System (IDS)) that may be configured in or be operatively coupled with the NSD 102, wherein the detection engine can be continuously updated with the latest attack signatures so as to provide maximum vulnerability protection to the connected USB device 106.

In an exemplary implementation, NSD 102 of the present disclosure can have a daemon running on it to perform the scans described above; using modules described further below with reference to FIG. 2. To illustrate, when mobile device 106-1 is connected to USB port 104-3 of NSD 102, mobile device 106-1 can start getting charged. In addition, NSD 102 can also run security scans on mobile device 106-1 as elaborated above. In a similar manner, when USB storage device 106-2 is connected to port 104-2 of NSD 102, NSD 102 can run security scans on USB storage device 106-2 as elaborated above. Both USD devices 106-1 and 106-2 can be connected simultaneously to NSD 102 that can simultaneously run security scans on both devices.

Those skilled in the art will appreciate that as attributes of each USB device 106 are different, security scans being run on device 106-1 can be different from those being run on device 106-2. In a similar manner, all or any combination of ports of NSD 102 can be connected to various USB devices, and NSD 102 can run antivirus and vulnerability scans on them as required. Therefore, as firmware, operational parameters, operating system, applications, file format, among many other attributes of each USB device 106 is different, security scans being run and the manner in which they are executed may be different for each USB device 106—even between similar or identical USB devices, such as two iPhones, as their firmware status, version, operating system, upgrade settings, system settings may be different. As a result of such firmware, operating system and other configuration differences, a separate set of security scans may be retrieved by NSD 102 based on such or any other combination of attributes of USB devices 102. In another aspect, if desired and configured, the same security scans may also be run on each similar/heterogeneous USB device 106.

In an exemplary aspect, NSD 102 can evaluate whether a USB device 106 connected to one of its port is up to date by comparing any or a combination of USB devices' firmware, operating system, application(s), and other attribute values with corresponding most recent versions/values available, and accordingly, if required, downloading and installing the most recent versions. By this, the proposed system/NSD 102 ensures that each USB device 106 is updated with respect to its core attributes values/versions. In an aspect, such an evaluation for ensuring that any or a combination latest firmware, operating system (OS), attributes, attribute values, and/or applications are updated in USB devices 106, can help prevent USB device level attacks/vulnerabilities. Alternatively, rather than updating aspects of USB device 106 found to be out-of-date, a report noting the existence of updates may be made available to the administrator of NSD 102.

In an aspect, as those skilled in the art will appreciate, although embodiments of the present disclosure are explained with reference to upgrading of firmware, applications, and/or operating system, depending upon the particular implementation, any other hardware element or software attribute of the USB device can also be upgraded/updated. For instance, updating of kernel modules, drivers, plugins, and software applications, may also be upgraded and are expressly contemplated.

Figure 2:
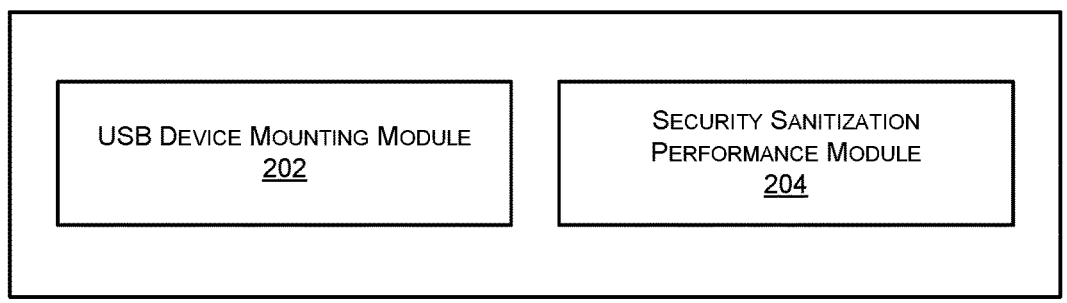
FIG. 2 illustrates an exemplary module diagram for performing security sanitization of a USB device in accordance with an embodiment of the present invention.

FIG. 2 illustrates an exemplary module diagram 200 for performing security sanitization of a USB device in accordance with an embodiment of the present invention. As illustrated, NSD 200 can include a USB device mounting module 202, and a security sanitization performance module 204, wherein the mounting module 202 of NSD 200 can enable NSD 200 to detect a USB device connected to a USB port of NSD 200, and can enable NSD 200 to facilitate read and write access to a memory of the USB device by mounting the USB device within a file system of NSD 200.

In another aspect, security sanitization performance module 204 can enable, for instance by means of a daemon running on NSD 200, performance of security sanitization/scans of the USB device, wherein such scans, as part of the sanitization process, can include any or a combination of an antivirus (AV) scan to identify existence of one or more known viruses using an AV engine of NSD 200, and a vulnerability scan for one or more known vulnerabilities or exploits using a detection engine (such as an Intrusion Detection System (IDS)) of NSD 200.

In yet another aspect, any or a combination of module 202 and module 204 can be executed by a daemon running on the NSD 200, wherein NSD 200 can evaluate whether USB devices connected to its ports are up to date by comparing the USB devices' firmware, operating system, and applications with the corresponding most recent versions available, and downloading and installing the most recent versions, if required. Depending upon the particular implementation, the daemon running on NSD 200 can execute any or a combination of the modules elaborated herein.

In another aspect, NSD 200 of the present disclosure can deploy a vulnerability repair unit (e.g., block 318 of FIG. 3D) so as to remove any viruses and update any vulnerabilities in any of the connected USB devices. The vulnerability repair unit can be configured within NSD 200 as part of module 204, or can be operatively coupled to NSD 200.

In yet another aspect, NSD 200 can deploy a USB device upgrade unit (e.g., block 320 of FIG. 3D) so as to update any or a combination of firmware, operating system, and application(s) of the connected USB devices. USB upgrade unit can be configured within NSD 200 as part of module 204, or can be operatively coupled to the NSD 200.

FIGS. 3A to 3D illustrate exemplary diagrams showing how security sanitization can be performed on a USB device by a network security device in accordance with an embodiment of the present invention.

Figure 3A:
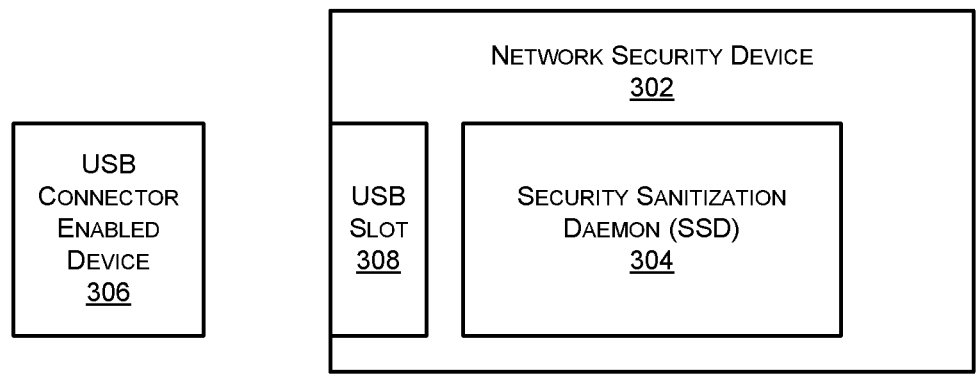
FIGS. 3A to 3D illustrate exemplary diagrams showing how security sanitization can be performed on a USB device by a network security device in accordance with an embodiment of the present invention.

FIG. 3A illustrates a network security device (NSD) 302 in accordance with an embodiment of the present invention. NSD 302 can have the modules described above configured within it and can be operatively configured with at least one USB port (shown as USB slot 308) adapted to accommodate and connect NSD 302 to any USB device.

Figure 3B:
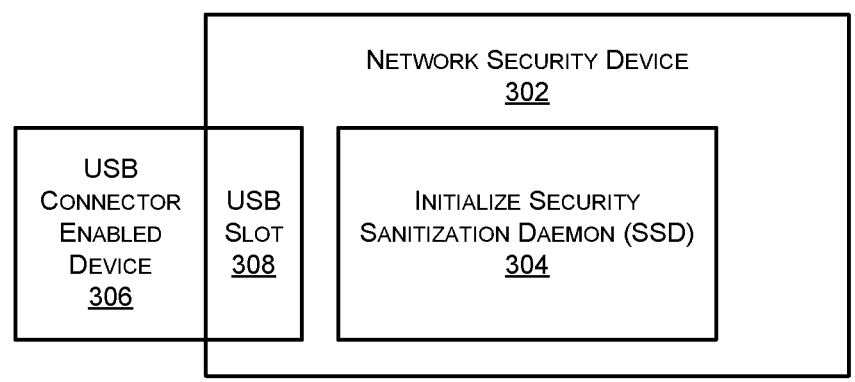

In an aspect, NSD 302 can have a security sanitization daemon (SSD) 304 running on it configured to execute the modules elaborated above and perform the security scans as also described above. In an exemplary embodiment, a USB connector enabled device 306 (which may hereinafter be referred to as USB device 306) can use its USB connector to connect to NSD 302 using USB slot/port 308 of NSD 302. As illustrated in FIG. 3B, connector of USB device 306 can be inserted into USB slot 308 to connect USB device 306 to NSD 302. As USB device 306 is connected to NSD 302, SSD 304 can be initialized and can start executing various modules relating to performance of security sanitization and potential (optional) upgrading of various aspects (e.g., firmware, operating system and/or applications) of USB device 306.

Figure 3C:
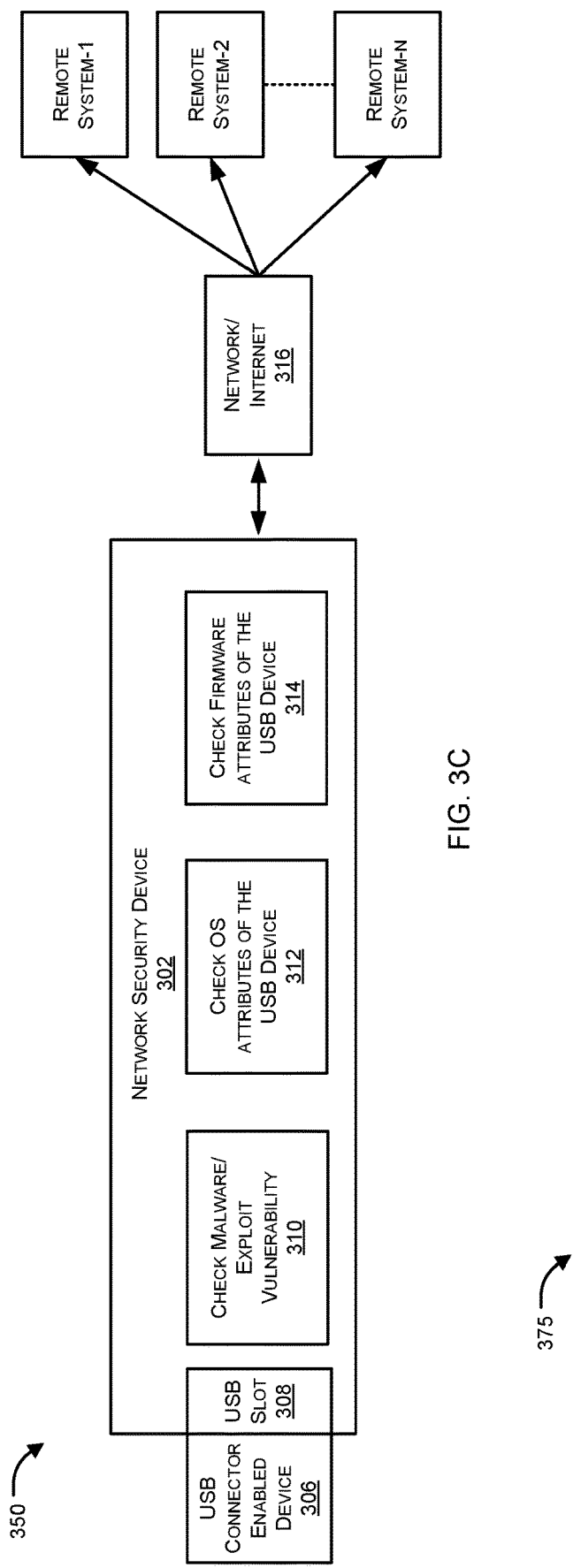

In another aspect, with reference to FIG. 3C, NSD 302 can be operatively connected to a network/Internet 316 that can in turn enable NSD 302 to query and send/receive data from various remote systems illustrated as Remote System-1, Remote System-2 . . . Remote System-N. For instance, when during a security scan on device 306, NSD 302 determines that the version of the firmware or the operating system of device 306 is not up-to-date, NSD 302 can query Remote System-1 that manages device 306 so as to obtain the latest firmware/operating system for device 306, and accordingly, based on the rights accorded to NSD 302 by the administrator, install the latest firmware/update/operating system within device 306. Similarly, NSD 302 can also receive the latest anti-virus signatures from Remote System-2, and/or updates for detecting new exploits/vulnerabilities from Remote System-N.

In yet another aspect, as illustrated by FIG. 3C, after USB device 306 has been connected to NSD 302 via USB slot 308, NSD 302 can check malware/exploit vulnerability of USB device 306 as illustrated at block 310, can check for OS attributes of the USB device 306 as illustrated at block 312, and can check for firmware attributes of USB device 306, as illustrated at block 314, while using network/Internet 316.

In an aspect, using network/Internet 316 and by querying/receiving data from any or a combination of Remote System-1, Remote System-2, . . . , and Remote System-N; NSD 302 can check for potential malware/exploit vulnerabilities of USB device 306. For this purpose, NSD 302 can receive the latest antivirus signatures/attack signatures for USB device 306 and can scan USB device 306 accordingly using any or a combination of AV engine and/or detection engine that are configured within NSD 302.

Figure 3D:
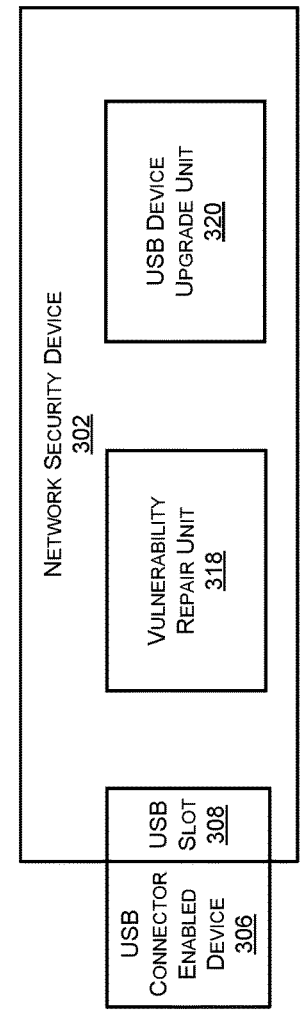

In an aspect, SSD 304 can execute any or a combination of the modules of NSD 302 described above with reference to FIG. 2. When a virus, malware, exploit, or vulnerability is found, NSD 302 can deploy a vulnerability repair unit (such as vulnerability repair unit 318 of FIG. 3D) to remove the detected virus, malware or vulnerability. In an alternate exemplary embodiment, vulnerability repair unit 318 can be configured within NSD 302 (as shown in FIG. 3D), or can be operatively coupled to NSD 302. In an exemplary aspect, vulnerability repair unit 318 can be configured as part of the security sanitization performance module 204 elaborated in FIG. 2 above and/or can be executed by SSD 304.

In another aspect, using network/Internet 316 and by querying/receiving data from any or a combination of Remote System-1, Remote System-2, . . . , and Remote System-N; NSD 302 can compare the firmware version/configuration installed on USB device 306 with the latest firmware version available for USB device 306 such that if the result of such an evaluation/comparison indicates the firmware version/configuration installed on USB device 306 is out-of-date, NSD 302 (or any other device operatively coupled thereto) can download and install the latest firmware version on USB device 306. For this purpose, NSD 302 can deploy a USB device upgrade unit (e.g., USB device upgrade unit 320 as illustrated in FIG. 3D). In an alternate exemplary embodiment, USB device upgrade unit 320 can be configured within NSD 302 (as shown in FIG. 3D), or can be operatively coupled to NSD 302. In an aspect, the USB device upgrade unit 320 can be part of the security sanitization performance module 204 elaborated in FIG. 2 above and can be executed by SSD 304.

In yet another aspect, using network/Internet 316 and by querying/receiving data from any or a combination of Remote System-1, Remote System-2, . . . , and Remote System-N; the NSD 302 can compare the version of an operating system (OS) installed on USB device 306 with the latest OS version available for the USB device 306 such that if the result of such an evaluation indicates that the version of the operating system installed on USB device 306 is not the most recent operating system version, NSD 302 can download and install the latest operating system version on USB device 306. For this purpose, NSD 302 can deploy USB device upgrade unit 320 that can be configured within NSD 302 (as shown in FIG. 3D), or can be operatively coupled to NSD 302. In an aspect, USB device upgrade unit 320 can be part of the security sanitization performance module 204 elaborated in FIG. 2 above and can be executed by the SSD 304.

In another aspect, using network/Internet 316 and by querying/receiving data from any or a combination of Remote System-1, Remote System-2, . . . , and Remote System-N; NSD 302 can compare the version of an application installed on USB device 306 with the latest corresponding application version available for USB device 306 such that if the result of such an evaluation indicates that the version of application installed on USB device 306 is not the most recent application version, NSD 302 can download and install the latest application version on USB device 306. For this purpose, NSD 302 can deploy a USB device upgrade unit (e.g., USB device upgrade unit 320 as shown in FIG. 3D) that can be configured within NSD 302, or that can be operatively coupled to NSD 302.

In another aspect, when the existence of one or more known viruses is identified or existence of one or more known vulnerabilities or exploits is identified, NSD 302 can instead or in addition to performing an upgrade, alert at least one of its administrators. In an aspect, NSD 302 can include any or a combination of a gateway device, a firewall device, an intrusion prevention system (IPS), an intrusion detection system (IDS) and a Unified Threat Management (UTM) device. In yet another aspect, USB device 306 can include a data storage device, a fitness tracker, a smartphone, a tablet computer, a smart watch, a smart glass or an Internet of Things (IoT) device. Any other like device that can act as a USB device and enable aspects of the present invention is also therefore well within the scope of the present disclosure. For instance, such devices can also include, but not limited to, insulin pumps, socket plugs, among other like devices.

Figure 4:
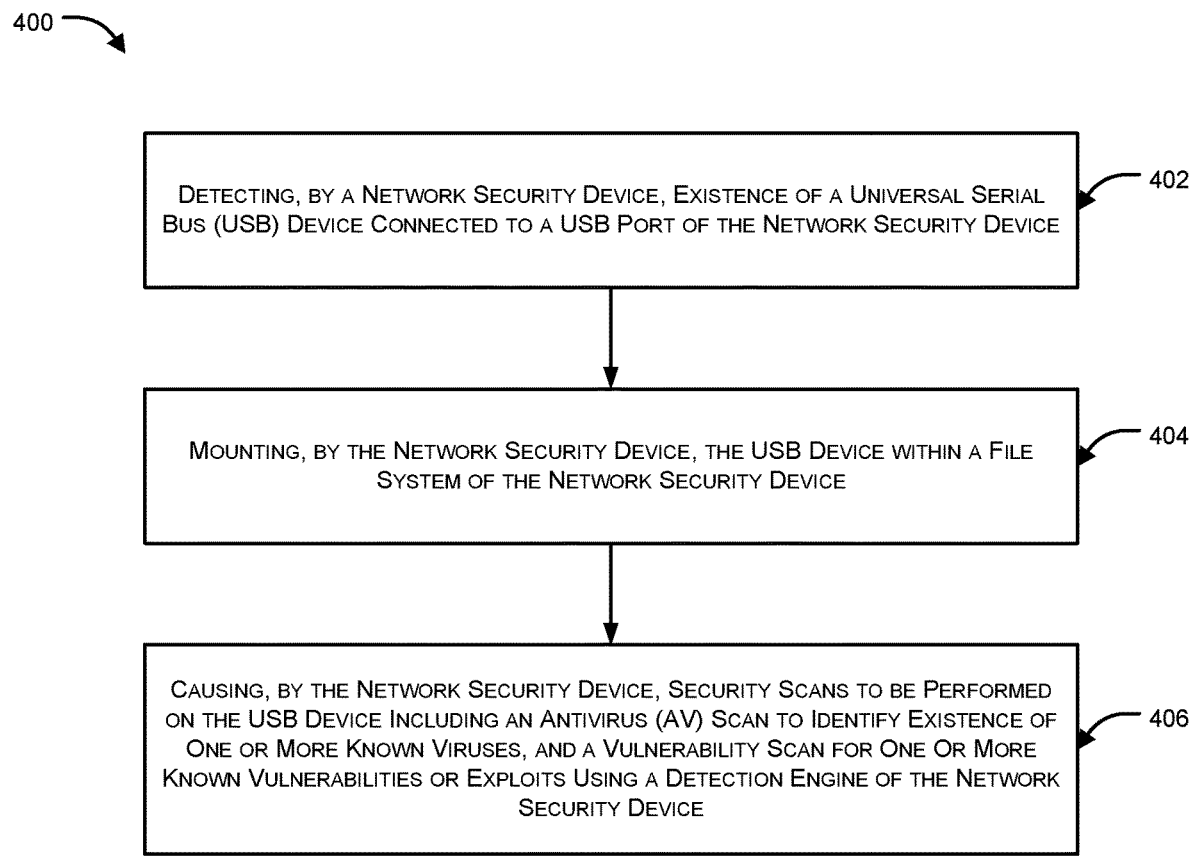
FIG. 4 illustrates a flow diagram for performing security sanitization of a USB device in accordance with an embodiment of the present invention.

FIG. 4 illustrates a flow diagram 400 for performing security sanitization of a USB device, in accordance with an embodiment of the present invention. In an aspect, the method includes, at step 402, detecting, by a network security device, existence of a Universal Serial Bus (USB) device connected to a USB port of the network security device, and at step 404, responsive to such detection, facilitating read and write access to a memory of the USB device, by mounting, by the network security device, the USB device within a file system of the network security device. The method can finally include, at step 406, causing, by the network security device, security scans to be performed on the USB device, including: (i) an antivirus (AV) scan to identify existence of one or more known viruses using an AV engine of the network security device and (ii) a vulnerability scan for one or more known vulnerabilities or exploits using a detection engine of the network security device.

Figure 5:
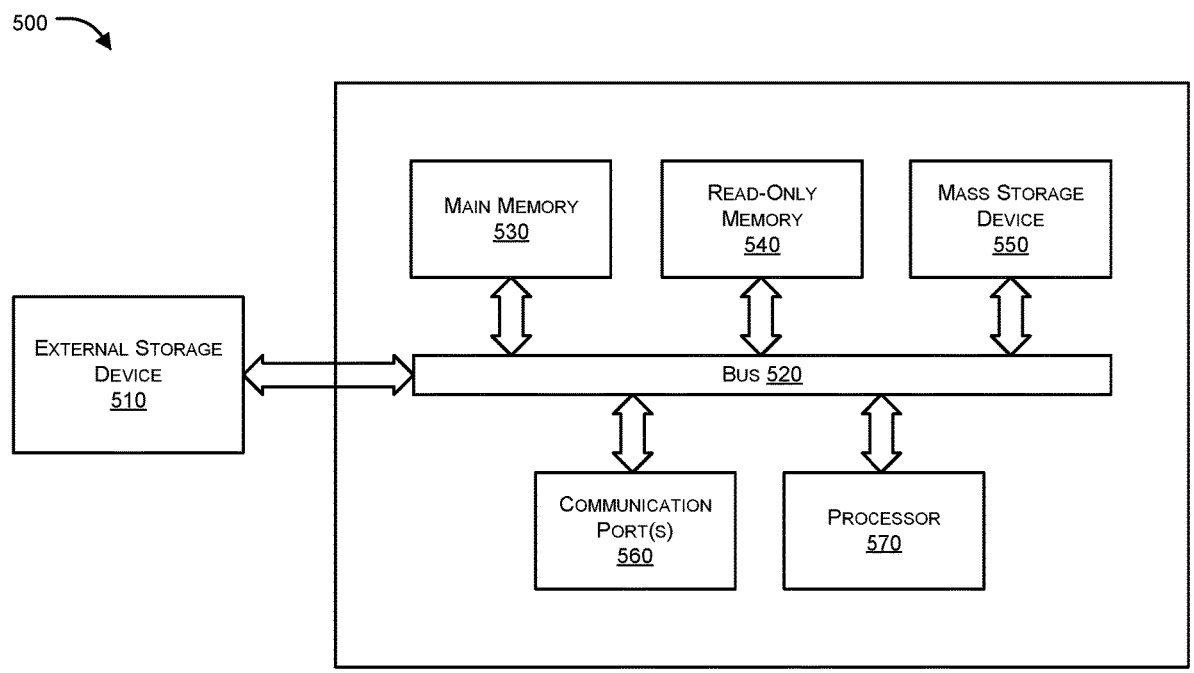
FIG. 5 illustrates an exemplary computer system in which or with which embodiments of the present invention may be utilized in accordance with embodiments of the present disclosure.

FIG. 5 illustrates an exemplary computer system in which or with which embodiments of the present invention may be utilized in accordance with embodiments of the present disclosure. Computer system 500 may represent a network security device (e.g., NSD 102, 200 or 302). As shown, computer system 500 comprises a bus 520, a processor 570, communication port(s) 560, a main memory 530, an external storage device 510, a read-only memory 540 and a mass storage device 550. Computer system 500 may comprise more than one processor and communication ports.

Examples of processor 570 comprise, but are not limited to, an Intel® Itanium® or Itanium® 2 processor(s), or AMD® Opteron® or Athlon MP® processor(s), Motorola® lines of processors, FortiSOC™ system on a chip processors or other processors. Processor 570 may comprise various modules associated with embodiments of the embodiments herein.

Communication port 560 may be any of an RS-232 port for use with a modem based dialup connection, a 10/100 Ethernet port, a Gigabit or 10 Gigabit port using copper or fiber, a serial port, a parallel port, or other existing or other ports. Communication port 560 may be chosen depending on a network, such a Local Area Network (LAN), Wide Area Network (WAN), or any network to which computer system 500 connects.

Memory 530 may be Random Access Memory (RAM), or any other dynamic storage device commonly used. Read-only memory 540 may be any static storage device(s); e.g., but not limited to, a Programmable Read Only Memory (PROM) chips for storing static information; e.g. start-up or BIOS instructions for processor 570.

Mass storage device 550 may be any type of mass storage solution, which may be used to store information and/or instructions. Exemplary mass storage solutions comprise, but are not limited to, Parallel Advanced Technology Attachment (PATA) or Serial Advanced Technology Attachment (SATA) hard disk drives or solid-state drives (internal or external; e.g., having Universal Serial Bus (USB) and/or Firewire interfaces), and one or more optical discs, Redundant Array of Independent Disks (RAID) storage; e.g. an array of disks (e.g., SATA arrays).

Bus 520 communicatively couples processor(s) 570 with the other memory, storage and communication blocks. Bus 520 may be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to a software system.

Optionally, operator and administrative interfaces; e.g. a display, keyboard, and a cursor control device, may also be coupled to bus 520 to support direct operator interaction with computer system 500. Other operator and administrative interfaces may be provided through network connections connected through communication port 560.

External storage device 510 may be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 500 limit the scope of the embodiments herein.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   detecting, by a network security device, existence of one or more Universal Serial Bus (USB) devices connected to one of a plurality of USB ports of the network security device, wherein the network security device comprises a firewall device, an intrusion prevention system, an intrusion detection system or a unified threat management device;

responsive to said detecting, facilitating read and write access to a memory of the USB device, by mounting, by the network security device, the USB device within a file system of the network security device;

identifying, by the network security device, a particular set of security scans of a plurality of security scans to perform on the USB device based on one or more of hardware, operating system and firmware attributes of the USB device and potential exploits associated therewith; and causing, by the network security device, the particular set of security scans to be performed on the USB device, including: (i) an antivirus (AV) scan to identify existence of one or more known viruses using an AV engine of the network security device and (ii) a vulnerability scan for one or more known vulnerabilities or exploits using a Detection Engine of the network security device.

2. The method of claim 1, further comprising evaluating, by the network security device, whether the USB device is up to date.

3. The method of claim 2, wherein said evaluating includes comparing a version of firmware installed on the USB device with a most recent firmware version available for the USB device.

4. The method of claim 3, wherein when a result of said evaluating is negative, then:
downloading, by the network security device, the most recent firmware version; and
causing, by the network security device, the most recent firmware version to be installed on the USB device.

5. The method of claim 2, wherein said evaluating includes comparing a version of an operating system installed on the USB device with a most recent operating system version available for the USB device.

6. The method of claim 5, wherein when a result of said evaluating is negative, then:
downloading, by the network security device, the most recent operating system version; and
causing, by the network security device, the most recent operating system version to be installed on the USB device.

7. The method of claim 2, wherein said evaluating includes comparing a version of an application installed on the USB device with a most recent application version available for the USB device.

8. The method of claim 7, wherein when a result of said evaluating is negative, then:
downloading, by the network security device, the most recent application version; and
causing, by the network security device, the most recent application version to be installed on the USB device.

9. The method of claim 2, wherein when the existence of the one or more known viruses is identified or the existence of the one or more known vulnerabilities or exploits is identified, then alerting an administrator of the network security device.

10. The method of claim 1, wherein the USB device comprises a data storage device, a fitness tracker, a smartphone, a tablet computer, a smart watch, a smart glass or an Internet of Things (IoT) device.

11. The method of claim 1, wherein said causing, by the network security device, the particular set of security scans to be performed on the USB device is performed by a daemon running on the network security device.

12. A non-transitory computer-readable storage medium embodying a set of instructions, which when executed by one or more processors of a network security device comprising a firewall device, an intrusion prevention system, an intrusion detection system or a unified threat management device, cause the one or more processors to perform a method comprising:

detecting existence of one or more Universal Serial Bus (USB) devices connected to one of a plurality of USB ports of the network security device;

responsive to said detecting, facilitating read and write access to a memory of the USB device, by mounting the USB device within a file system of the network security device;

identifying a particular set of security scans of a plurality of security scans to perform on the USB device based on one or more of hardware, operating system and firmware attributes of the USB device and potential exploits associated therewith; and causing the particular set of security scans to be performed on the USB device, including: (i) an antivirus (AV) scan to identify existence of one or more known viruses using an AV engine of the network security device and (ii) a vulnerability scan for one or more known vulnerabilities or exploits using a Detection Engine of the network security device.

13. The non-transitory computer-readable storage medium of claim 12, wherein the method further comprises evaluating whether the USB device is up to date.

14. The non-transitory computer-readable storage medium of claim 13, wherein said evaluating includes one or more of:
comparing a version of firmware installed on the USB device with a most recent firmware version available for the USB device;
comparing a version of an operating system installed on the USB device with a most recent operating system version available for the USB device; or
comparing a version of an application installed on the USB device with a most recent application version available for the USB device.

15. The non-transitory computer-readable storage medium of claim 14, wherein when a result of said evaluating is negative, then:
downloading, by the network security device, one or more of the most recent firmware version, the most recent operating system version and the most recent application version; and
causing, by the network security device, one or more of the most recent firmware version, the most recent operating system version and the most recent application version to be installed on the USB device.

16. The non-transitory computer-readable storage medium of claim 13, wherein when the existence of the one or more known viruses is identified or the existence of the one or more known vulnerabilities or exploits is identified, then alerting an administrator of the network security device.

17. The non-transitory computer-readable storage medium of claim 12, wherein the USB device comprises a data storage device, a fitness tracker, a smartphone, a tablet computer, a smart watch, a smart glass or an Internet of Things (IoT) device.

18. The non-transitory computer-readable storage medium of claim 12, wherein said causing the particular set of security scans to be performed on the USB device is performed by a daemon running on the network security device.

19. A network security device, comprising:

a processor;

a network interface communicatively coupled to the processor; and a memory communicatively coupled to the processor and storing source code that, when executed by the processor:

- detects existence of one or more Universal Serial Bus (USB) devices connected to one of a plurality USB ports of the network security device, wherein the network security device comprises a firewall device, an intrusion prevention system, an intrusion detection system or a unified threat management device;
- responsive to said detecting, facilitates read and write access to a memory of the USB device, by mounting the USB device within a file system of the network security device;
- identifies a particular set of security scans of a plurality of security scans to perform on the USB device based on one or more of hardware, operating system and firmware attributes of the USB device and potential exploits associated therewith; and
- causes the particular set of security scans to be performed on the USB device, including: (i) an antivirus (AV) scan to identify existence of one or more known viruses using an AV engine of the network security device and (ii) a vulnerability scan for one or more known vulnerabilities or exploits using a Detection Engine of the network security device.

* * * * *